United States Patent [19]
Montgomery

[11] Patent Number: 5,253,271
[45] Date of Patent: Oct. 12, 1993

[54] METHOD AND APPARATUS FOR QUADRATURE AMPLITUDE MODULATION OF DIGITAL DATA USING A FINITE STATE MACHINE

[75] Inventor: Michael A. Montgomery, Cedar Park, Tex.

[73] Assignee: Schlumberger Technology Corporation, Austin, Tex.

[21] Appl. No.: 657,224

[22] Filed: Feb. 15, 1991

[51] Int. Cl.$^5$ ............... H04L 5/12; H04L 23/02; H04L 27/20
[52] U.S. Cl. ........................... 375/59; 332/103
[58] Field of Search ............ 375/39, 59, 60, 61; 455/59, 60; 364/724.16; 332/103, 149; 341/106

[56] References Cited

U.S. PATENT DOCUMENTS

| | | | |
|---|---|---|---|
| 3,514,750 | 5/1970 | Pritchett et al. | |
| 3,665,314 | 5/1972 | Leuthold | 375/61 X |
| 4,646,326 | 2/1987 | Backof, Jr. et al. | 375/39 |
| 4,736,389 | 4/1988 | Debus, Jr. et al. | 375/59 |

FOREIGN PATENT DOCUMENTS

| | | |
|---|---|---|
| 0256700 | 2/1988 | European Pat. Off. |
| 0398581 | 11/1990 | European Pat. Off. |
| 0458385 | 11/1991 | European Pat. Off. |

OTHER PUBLICATIONS

Kanno, Norio and Katsuyoshi Ito, "Fiber Optic Broadband Visual Signals Transport Employing High-Level QAM," IEEE Global Telecommunications Conference, 1987, vol. 3, of 3, IEEE, N.Y., 1987, pp. 11477-11484.

*Primary Examiner*—Curtis Kuntz
*Assistant Examiner*—Tesfaldet Bocure
*Attorney, Agent, or Firm*—Charles D. Huston

[57] ABSTRACT

A transmitter using quadrature amplitude modulation is described which eliminates all microprocessors by using a finite state machine implementation. In particular, the transmitter and method eliminates the complex mathematics from the quadrature amplitude modulation involving the signal space mapping and modulation computations. The transmitter is particularly designed for use in an oil well logging application where the transmitter resides in the harsh downhole environment of an oil well. The transmitter not only reduces hardware cost and complexity, but also improves performance while reducing failures and development time.

12 Claims, 13 Drawing Sheets

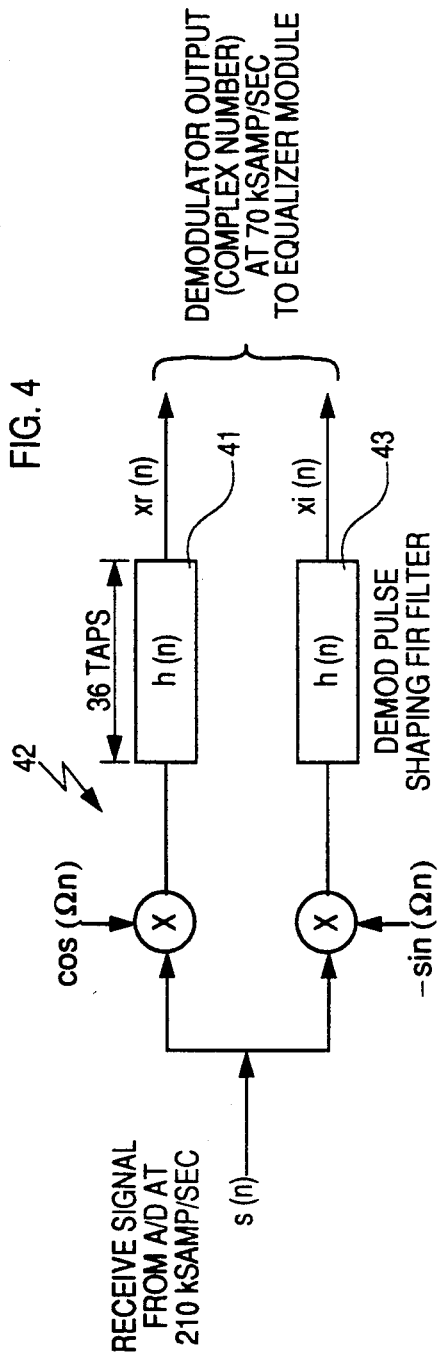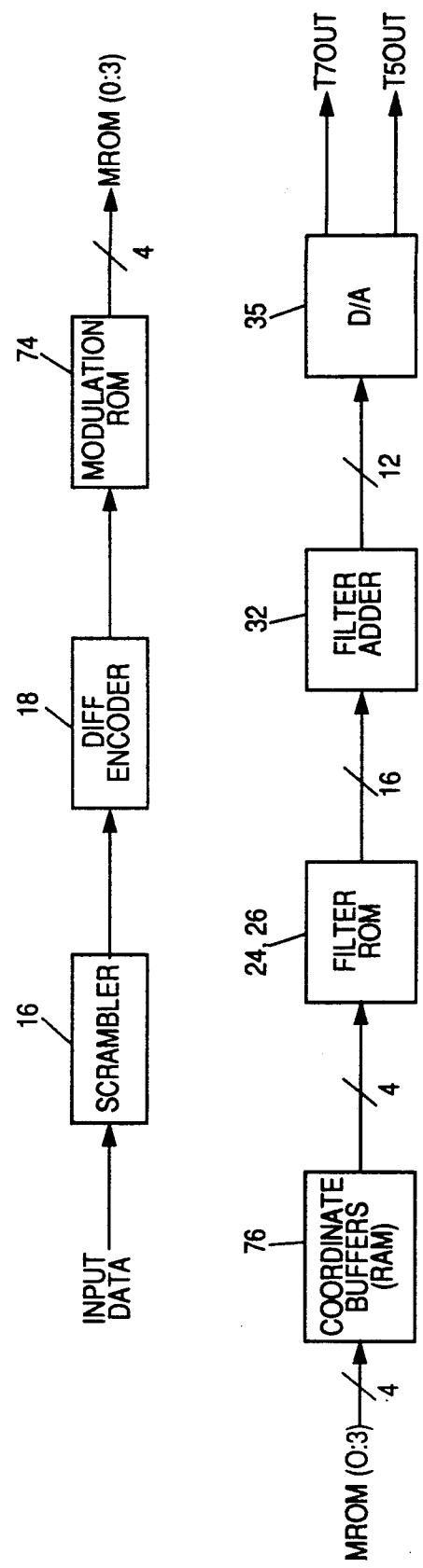

TRANSMITTER DATA ENCODER & SCRAMBLER

RECEIVER DATA DECODER & DESCRAMBLER

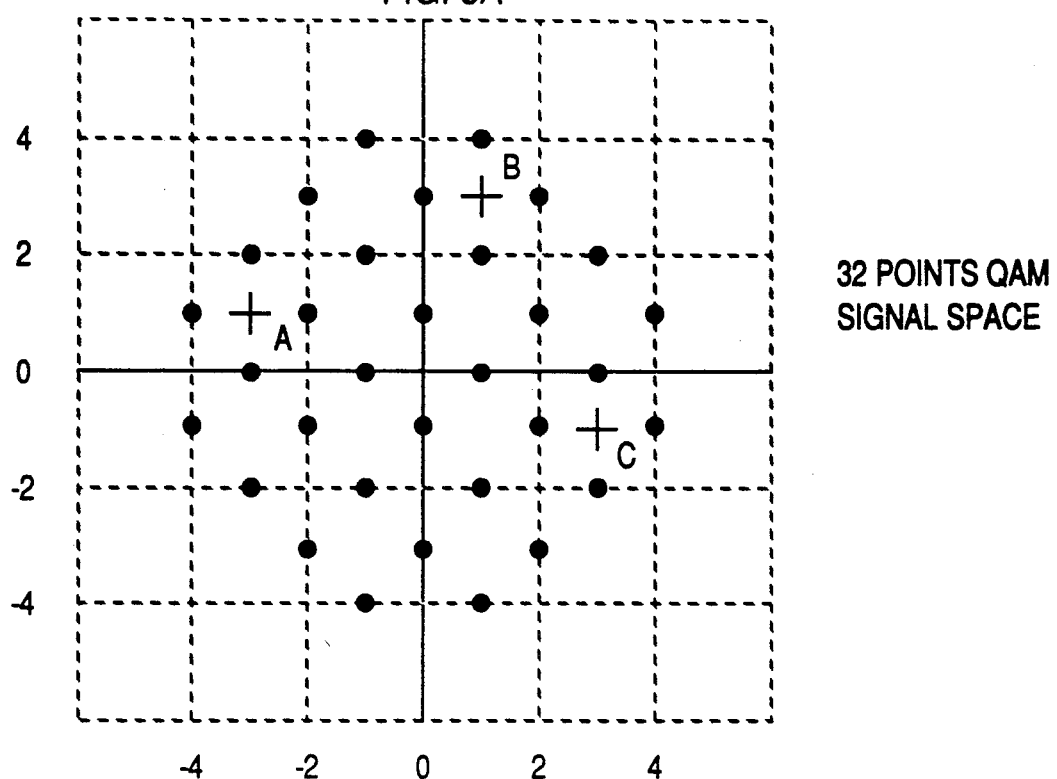
32 POINTS QAM SIGNAL SPACE
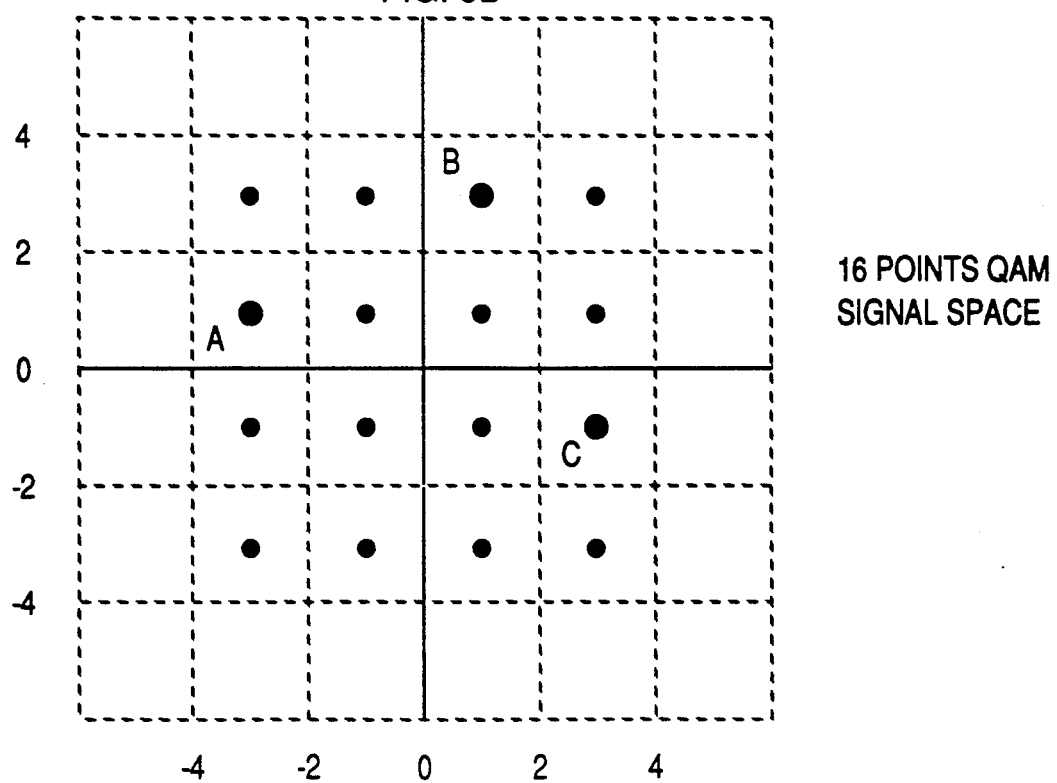
16 POINTS QAM SIGNAL SPACE

64 POINTS QAM
SIGNAL SPACE

8 POINTS QAM
SIGNAL SPACE

Coding QAM Signals For Five Bits Per Symbol

Intersymbol Interference For Sin(X) / X Shaped Pulses

METHOD AND APPARATUS FOR QUADRATURE AMPLITUDE MODULATION OF DIGITAL DATA USING A FINITE STATE MACHINE

FIELD OF THE INVENTION

The present invention relates generally to systems and methods for the transmission of digital data over transmission lines. In particular, the present invention relates to a transmitter used in a well-logging application is disclosed where data gathered by a downhole logging tool is transmitted to the surface using a finite state implementation.

BACKGROUND OF THE INVENTION

In many domains it is desirable to take measurements of physical phenomena and transmit the digital data acquired over a transmission line. Measuring the characteristics of earth formations is a good example. Measurements of the characteristics of different earth formations traversed by a borehole are generally carried out by lowering into the borehole a "tool" containing various types of sensing instrumentation. The tool is attached to a logging cable which is used both for holding the equipment and as an electrical medium for the transmission of data signals from the tool to a data receiver on the surface.

Most downhole data acquisition systems currently in use process and store the information thus gathered in digital form. A digital signal carrying that information has frequency components ranging from very high to very low (or d.c.) frequencies and is referred to as a baseband signal. Baseband signals cannot normally be transmitted over bandpass channels (i.e., those channels which transmit only a limited range of frequencies) such as logging cable due to pulse-shape and frequency distortion of the signal. Therefore, it is necessary to resort to modulation methods whereby the transmitter modulates a sinusoidal carrier waveform with the baseband signal, the modulated carrier being suitable for transmission over the bandpass channel. The uphole receiver then recovers the baseband signal by demodulation, the modulator-demodulator pair being referred to as a modem.

In order to reduce downtimes, it is typical to simultaneously lower into the borehole several tools in the same combination. The information gathered by the different tools must then be transmitted to the surface either by time or frequency multiplexing. When it is desired to increase the number of tools within a given combination and yet to have the same quantity of data transmitted per tool per unit of time, the data transmission rate must be increased. That rate, however, is limited by both the frequency characteristics of the logging cable as well as environmental constraints on the downhole transmitter.

The logging cable has a relatively narrow useable bandwidth of about 5 kHz to 90 kHz: however, it does have a high signal to noise ratio of about 30 dB. The downhole environment sometimes reaches temperatures of 175° C. These high temperatures restrict the selection of analog and digital components, which eliminates many standard modulation techniques. Thus specialized techniques much be employed for implementing high data rate digital transmission systems in such environments. Further because of the harsh downhole environment and cost factors, it is desirable to eliminate as many components as possible from the transmitter and if possible, eliminate any microprocessors. There is a need, therefore, for a method and apparatus for transmitting digital data at high speeds over a bandpass channel. In particular, there is a need for transmitting log data at high data rates over logging cable.

SUMMARY OF THE INVENTION

The problems outlined above are solved by the method and apparatus for transmitting digital data of the present invention. The present invention is particularly advantageous for transmitting acquired digital information over bandpass channels at high speeds. In the preferred embodiment, the bandpass channel is a oil well-logging cable and the digital information is acquired from the downhole well-logging tools. The present invention uses combined amplitude and phase modulation—referred to as quadrature amplitude modulation ("QAM")—to achieve high speed data transfer. The present invention further increases the data transfer rate by reducing the processing load during the modulation by advantageously selecting the data sampling rate, the carrier frequency, or the encoding symbol rate. The embodiment of the present invention uses a finite state machine implementation of the quadrature amplitude modulation. In the present application "finite state" means that a result is stored and accessed in memory, as opposed to being computed using for example a microprocessor.

Broadly speaking, the method of transmitting acquired digital data over a bandpass channel of the present invention includes the steps of mapping the acquired digital data into a series of symbols, modulating the orthogonal carrier signal with the symbol streams representing the digital data, and converting the modulated carrier signal into an analog transmission waveform for passage over the bandpass channel. During mapping of the digital data (at a symbol rate) certain sequences of digital bits are represented by unique symbols where each symbol is a point in signal space. Preferably the location of each symbol is represented by an x, y coordinate pair and the symbol locations are output as two coordinate streams—x coordinate and y coordinate.

Functionally speaking, the coordinate streams are filtered to restrict the bandwidth and provide appropriate pulse shaping prior to modulating the carrier signal. During modulation each coordinate stream is multiplied by a sample of a carrier signal and the two resulting products are combined in phase quadrature to produce the sampled waveform sum. Preferably, the carrier signal comprises two orthogonal sinusoids with the carrier phase being an integer multiple of $\pi/2$ during each sample time. The resulting quadrature amplitude modulated sampled waveform is converted from a digital sampled waveform into an analog QAM waveform and transmitted over the bandpass channel.

The modulation method is implemented in the present invention using a finite state machine. That is, actual computation is not made but rather the product values are stored in a table storage device. The product values stored in the table storage device are based on multiplication factors which include a coordinate stream value multiplied by a digital sample of one of the orthogonal carrier signals. In a particularly preferred form, another multiplication factor is the filtering factor to restrict bandwidth and adjust pulse shaping. The modulation method further includes the substep of adding the x and y product values to form digital sampled waveforms.

These digital sample waveforms are converted to an analog transmission waveform for transmission over the bandpass channel. Preferably, the mapping step is similarly implemented using a finite state machine approach using a table lookup which is indexed by the symbols (representing the unique bit sequences) to address and output the x and y coordinate values for the respective symbols.

The present invention also includes a transmitter for acquiring and modulating digital data onto an analog transmission carrier. The transmitter includes a mapping mechanism for mapping the acquired digital data into a series of symbols and outputting the location of the symbols in signal space as two coordinate streams representing the x and y coordinates of the respective symbols. A modulation mechanism receives the x and y coordinate streams and effects quadrature amplitude modulation to output a modulated analog transmission carrier signal over the bandpass channel from which the original acquired digital data can be extracted. The modulation mechanism includes a table storage device for storing x and y product values and a converter mechanism for converting the digital sampled waveform sums into an analog transmission carrier. Multiplication factors used in the product values include the coordinate stream values and digital samples of the respective orthogonal carrier signals. In a preferred form, each carrier signal is sampled ("sample rate") at four times the rate of carrier signal frequency and three times the rate of symbol generation ("symbol rate").

While the use of quadrature amplitude modulation is a significant advance in transmitting acquired data digitally at high speeds (e.g. greater than 350 kilobits per second) over bandpass channels, careful selection of the sample rate, symbol rate, and carrier frequency further enhance the data transmission rate by reducing the computational load during modulation (and demodulation). This reduction in computational load facilitates the finite state implementation of a quadrature amplitude modulation transmitter of the present invention. For example, choosing the sample rate to be four times the frequency of the carrier signal and adjusting the carrier phase to always be an integer of $\pi/2$ during each sample time, results in amplitude samples for each of the orthogonal sinusoids of $+1$, $0$, $-1$, or $0$. During modulation this selection of the sample rate and carrier frequency obviates the need for true multiplication reducing the computational overhead.

Additionally, selecting the sample rate to be an integer multiple of the symbol rate further reduces computational overhead. The sample rate (e.g. 210 kHz) and symbol rate (e.g. 70 kHz) can be made equal by inserting 0 values in between actual symbol values in the x and y coordinate streams (e.g. two 0 values for every actual value). This selection also simplifies the low pass digital filtering of each of the x and y coordinate symbol streams through a transversal-type filter since no multiplications between the zero values and the tap weights, nor additions of these products, need to be performed. In the method of the preferred embodiment digitally acquired logging data is modulated using quadrature amplitude modulation, converted to analog, and transmitted over a bandpass channel such as a logging cable. The sample rate is chosen as 210 kHz, the symbol rate 70 kHz, and the carrier frequency 52.5 kHz to significantly reduce computational overhead. With a bit packing of 6 bits per symbol, high transmission rates are obtained (e.g. greater than 350 kilobits per second).

BRIEF DESCRIPTION OF THE DRAWINGS

FIG. 4 is a block diagram showing the demodulator portion of the receiver;

FIG. 5 is a block diagram illustrating the data path of the transmitter;

FIGS. 8A through 8D graphically depict the QAM signal spaces which define the symbol or transmit point coordinates used for the different data transmission rates by the present invention;

DESCRIPTION OF THE BEST MODE

I. Overview

Figure 1:
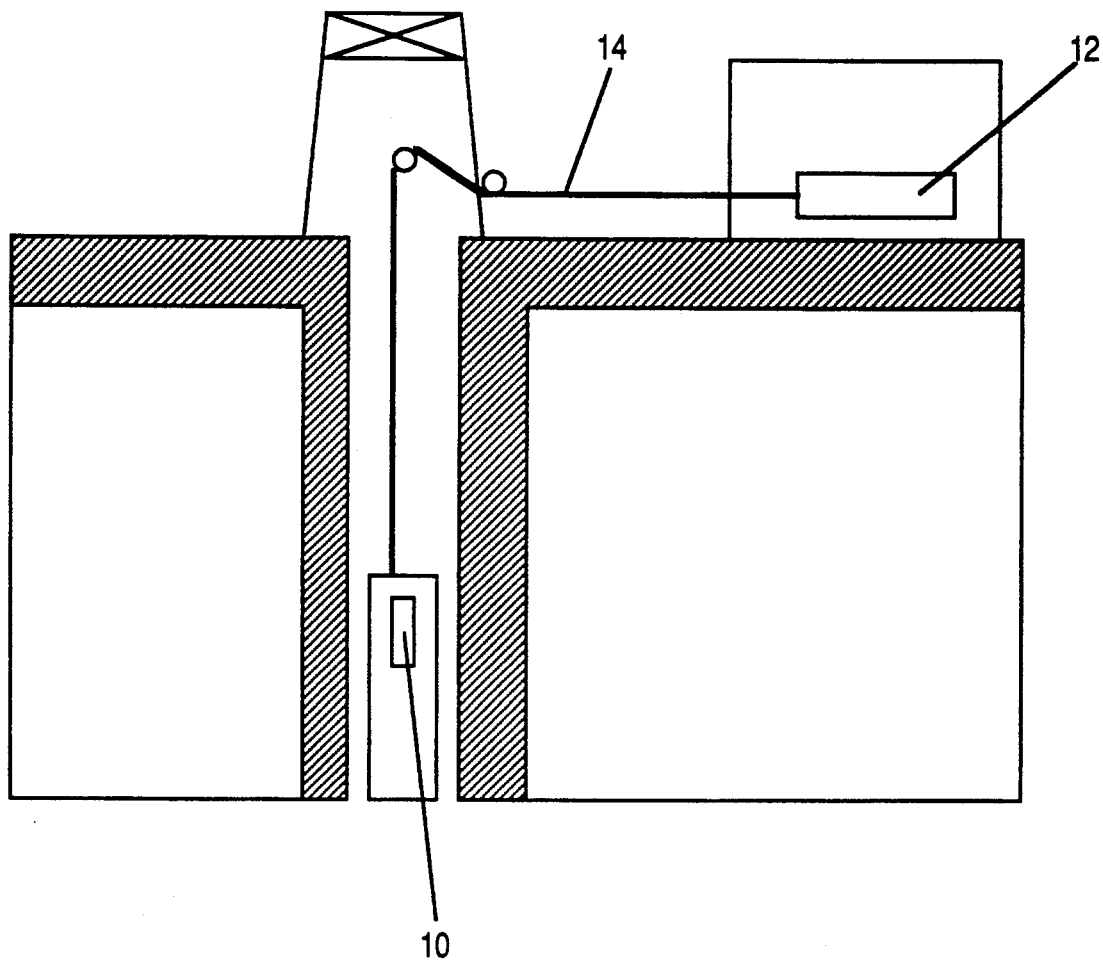
FIG. 1 is a schematic of the apparatus of the present invention in use in an oil well logging application.

In the drawings, the preferred embodiment of the apparatus of the present invention is illustrated in a wireline logging application. As shown in FIG. 1 a transmitter 10 receives the acquired digital data from the downhole well-logging instruments, the data being indicative of properties of the surrounding geological formation. The transmitter 10 communicates the acquired data to the surface receiver 12 via the logging cable 14. The logging cable 14 is an example of a bandpass channel. A "bandpass channel" is a communications link that transmits only a limited range of frequencies and thus does not lend itself well to the direct transmission of digital information.

Figure 2:
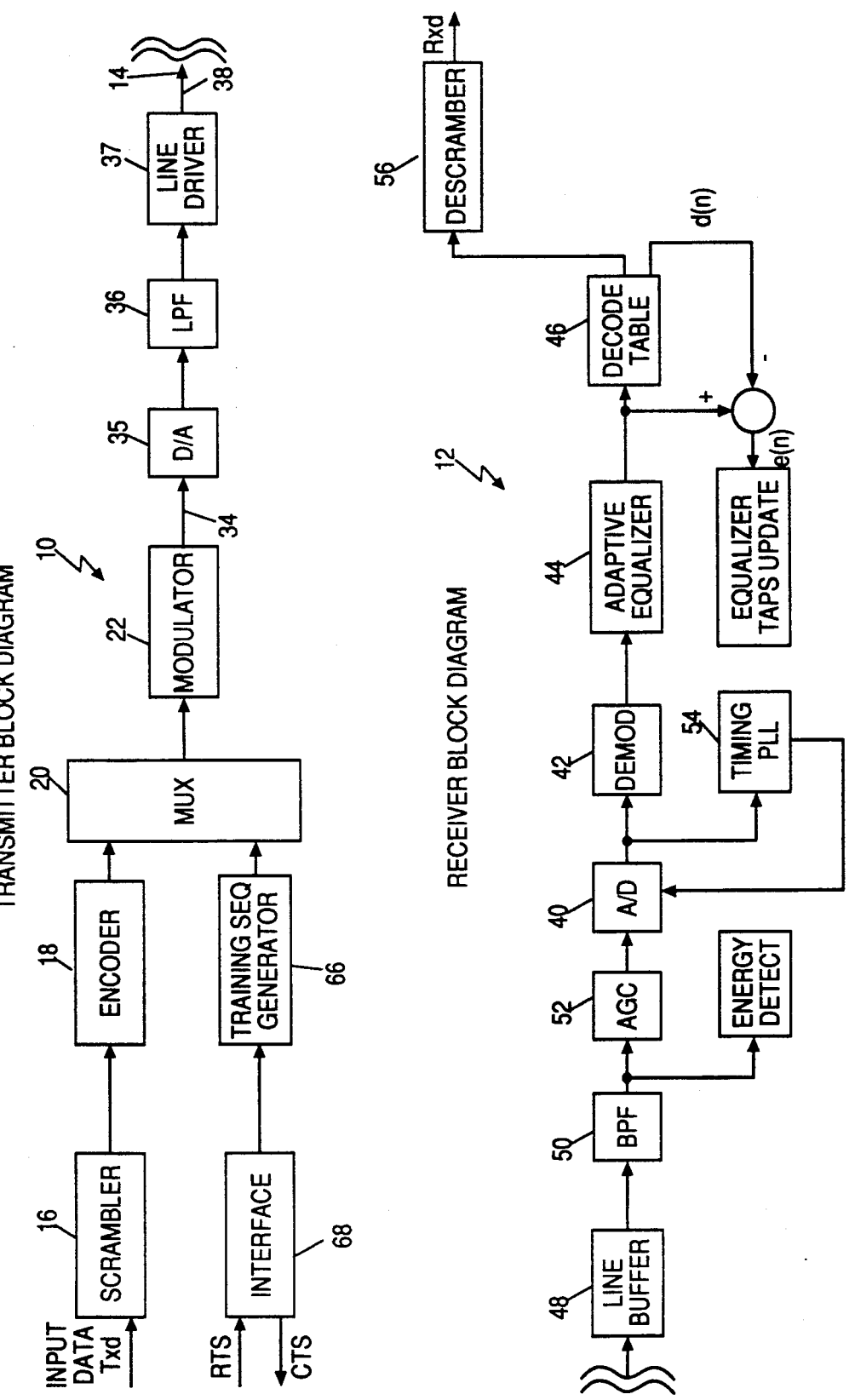
FIG. 2 is a block diagram of the transmitter and receiver in accordance with the present invention.
Figure 3:
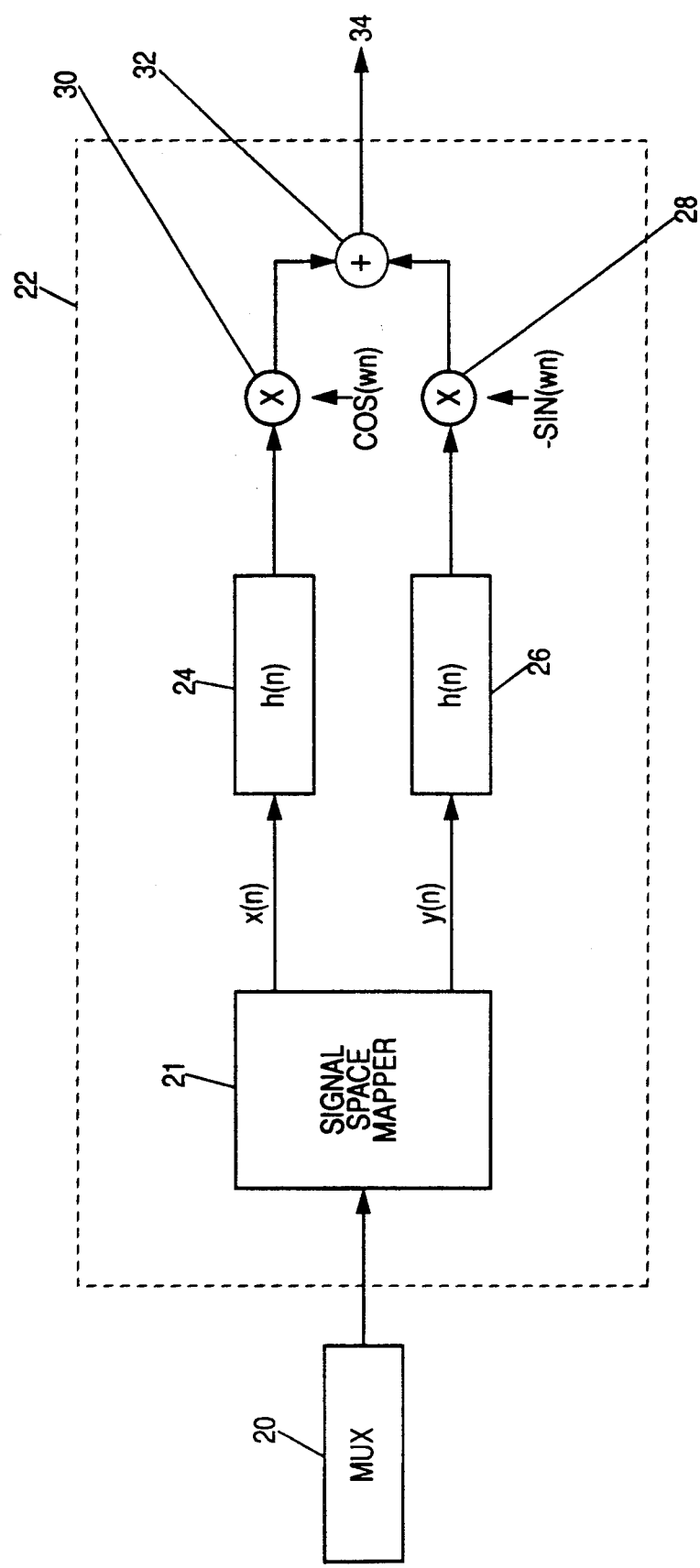
FIG. 3 is a block diagram illustrating the modulator portion of the transmitter.

As shown in FIG. 2 the transmitter 10 accepts baseband digital data input signal at scrambler 16. The scrambler 16 randomizes the input sequence to produce a uniform modulated frequency spectum. The randomized data is fed from scrambler 16 through an encoder 18 and multiplexor 20 to a modulator section 22. FIG. 3 shows functionally the operation of modulator section 22. The modulator section 22 includes a mapper 21 which maps the encoded baseband input signal into symbols at a symbol rate. Any scheme which maps a given sequence of bits into a unique symbol can be used. Each symbol is a pair of 4 bit digital words which specify the x, y coordinates of a point in two-dimensional signal space.

The signal space mapper 21 groups the input data bits into symbol table input words of length corresponding to a specified bits per symbol packing density. In the preferred embodiment the packing density is selectable at 3-6 bits per symbol. The symbol table input words are used to address the storage in mapper 21 having stored therein all the symbols of the QAM signal space at addresses corresponding to the symbol table input words represented by the symbol. Successive accesses of those symbols produce a symbol stream comprising x and y coordinate symbol streams. The rate of data input to the mapper 21 is referred to herein as the "symbol rate" (in the preferred embodiment 70 kHz). The two coordinate symbol streams (see FIG. 3) are stepped up to a "sampling rate" (in the preferred embodiment 210 kHz) by inserting zero values between the actual values. The sample rate is carefully selected to be an integer multiple of the symbol rate.

As shown in FIG. 3, each of the coordinate symbol streams, x(n) and y(n) output from mapper 21 are digitally represented amplitudes which are serially output at the sample rate to low-pass digital filters 24 and 26. Digital filters 24 and 26 are low pass finite impulse response (FIR) filters which restrict the bandwidth and provide appropriate pulse shaping to the analog version of the coordinate streams which will eventually appear at the output of the transmitter 10 in the form of an analog QAM waveform. Each of the filtered x(n) and y(n) coordinate streams output from filters 24, 26 is then multiplied by samples of one of the orthogonal carrier signals, $\sin(\omega n)$ or $\cos(\omega n)$ as at 28 and 30. The two amplitude-modulated carriers are added at 32 to produce a digital sampled waveform 34 (compare FIGS. 2 and 3).

By choosing the sample rate (e.g. 210 kHz) to be four times the frequency of the carrier signals (e.g. 52.5 kHz) and adjusting the carrier phase to always be an integer multiple of $\pi/2$ during each sample time, there results in amplitude samples for each of the orthogonal sinusoids of $+1$, 0, $-1$, or 0. This obviates the need for true multiplications between the carrier samples and the coordinate symbol streams, thereby reducing computational overhead. The sample rate (e.g. 210 kHz) is also chosen to be an integral multiple of the symbol rate (e.g. 70 kHz). The two rates (210 kHz and 70 kHz) can be made equal by inserting zero values in between the actual symbol values of both x and y symbol streams. This also simplifies the low-pass digital filtering at 24, 26 of the x and y coordinate symbol streams through a transversal-type filter since no multiplications between the zero values and the tap weights nor additions of those products need be performed.

The signal space encoding at 18 and modulation at 22 are implemented in the digital domain to produce the digital sampled waveform 34 which comprises serial amplitude samples of the modulated carrier at a specified sampling rate. The digital sampled waveform 34 is used to drive a digital-to-analog (D/A) converter 36 (FIG. 2) which generates the analog QAM waveform 38 for transmission over logging cable 14 after appropriate filter and driver 36, 37.

The modem receiver 12 essentially performs the inverse operation as the transmitter 10 (FIG. 2). After passage through a analog to digital (A/D) converter 40 the regenerated symbol stream is fed to a demodulator 42 where the x and y signal space coordinates are multiplied by sampled orthogonal carrier sinusoids (e.g. 52.5 kHz) and then fed through low pass filters in demodulator 42. The demodulator 42 also takes advantage of the sample rate being four times the frequency of the carrier signal and the carrier phase is adjusted to always be an integer multiple of $\pi/2$ during each sample time. This avoids having to implement true multiplications since the carrier wave is always at 0, $+1$, or $-1$ during the data sampling instant. The x and y coordinate symbol streams are then fed to an adaptive equalizer 44 to reduce intersymbol interference. A decoder module 46 regenerates the binary data input from the coordinate symbol streams by table lookup using a minimum distance criteria to estimate the most likely received point given the arrival of the equalizer output point during the symbol.

From this overview it should be readily apparent that the method and apparatus for transmitting digital data of the present invention capable of high transmission rates in a well-logging application. That is, with a transmission rate of 70,000 symbols per second over the logging cable 14, and with a bit packing of 6 bits per symbol, the present invention is capable of transmitting 420,000 bits per second over a single channel. With dual channels in the logging cable and each channel carrying 420,000 bits per second, an 840,000 bits per second transmission rate is possible. A more detailed explanation of the construction and operation of the apparatus of the preferred embodiment of of the present invention is offered below.

II. Detailed Description

A Quadrature Amplitude Modulation (QAM)

QAM techniques are known in the analog domain. See, I. Welber et al., Transmission Systems For Communications, Bell Laboratories, Holmdel, N.J., 1982 (incorporated by reference for background). The present invention extends known QAM techniques to the digital domain and further applies the technique to a well logging data communication application.

QAM transmissions consist of modulating two signals on orthogonal carriers (such as a sine and a cosine carrier) and combining them on the same transmission channel. Since the carriers are orthogonal, the receiver may recover the two transmitted signals by demodulating the incoming signal with identical sine and cosine carriers. This method of modulation allows twice as much data to be transmitted on a given channel as a standard Amplitude Modulation (AM) approach.

The principle of quadrature amplitude modulation is applied by the present invention to digital systems, and specifically to a well logging application. In the digital amplitude modulation system of the present invention, a carrier is modulated with discrete amplitude values. Those amplitude values are referred to as symbols with each symbol representing a specified bit sequence. By grouping the binary input data into discrete symbols, a symbol stream at a specified symbol rate is created which can then be used to modulate the carrier.

The overall data transmission rate then varies with the symbol rate and the number of bits packed into each symbol. The maximum symbol rate which can be used to modulate a carrier is subject to the bandwidth constraints of the transmission channel. The number of bits which can be packed into each symbol depends on how large the symbol set is (i.e., how many discrete symbols are available for assigning to a specified bit sequence). For detection at a constant error rate, the size of the symbol set is limited by the amount of signal power available. Even under that constraint, however, the symbol set can be effectively doubled in size if each symbol is made to comprise two coordinates with each of the resulting coordinate streams used to modulate an orthogonal carrier signal, the two orthogonal carrier signals then being combined in phase quadrature. Accordingly, in the present system, the binary input data is grouped into symbol groupings with each grouping used to produce a symbol consisting of two coordinates (referred to as x and y coordinates) in two-dimensional signal space. Each symbol or transmit point in signal space then represents a specified bit sequence.

One simple coding would be to code a digital one as the highest signal level and code a digital zero as the lowest signal level. In addition, it is necessary to determine how often the signals are to change. This is referred to as the symbol rate. With this simple coding, one bit can be transmitted on each signal at the channel symbol rate. Therefore, this simple code results in two bits being transmitted per symbol. At a symbol rate of 70,000 symbols per second, this results in a data transmission rate of 140,000 bits per second for that channel.

The symbol rate is limited by the available channel bandwidth. With a given channel bandwidth, the only way to increase the data transmission rate is to increase the number of bits that are packed into each symbol. This leads to more complex coding, as illustrated in FIG. 13.

Figure 13:
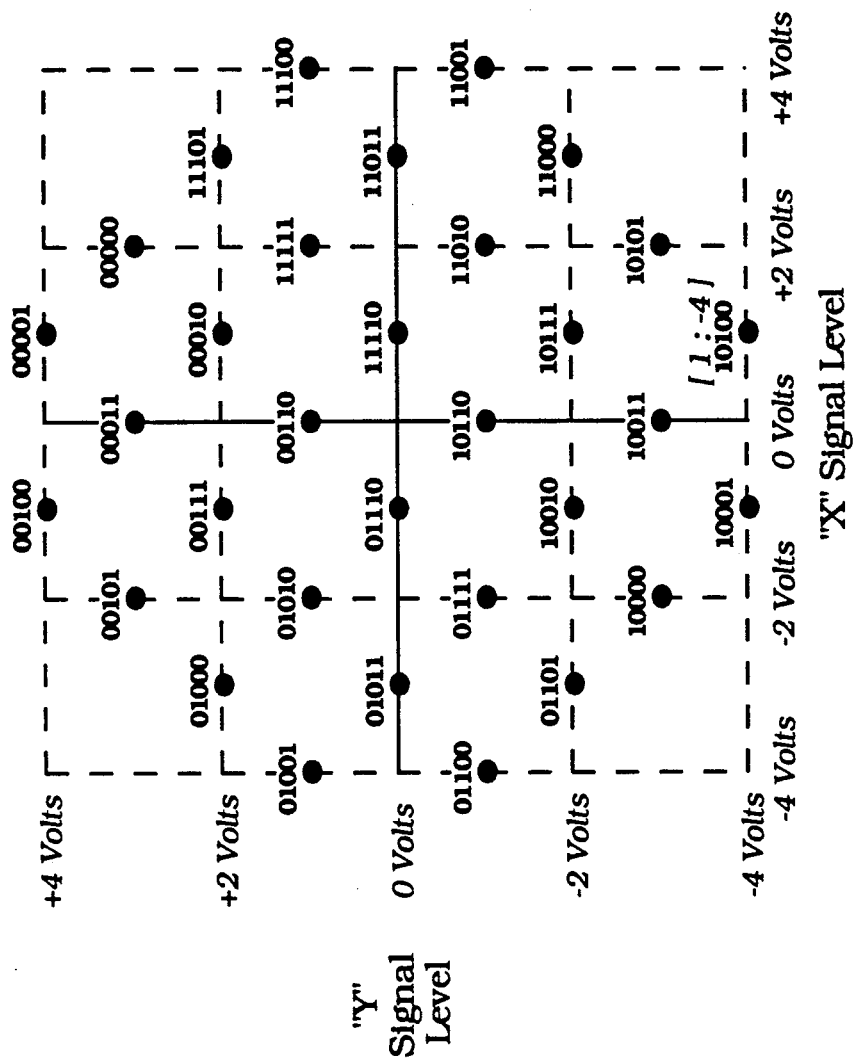
FIG. 13 is a graph illustrating the coding of QAM signals for five bits per symbol.

FIG. 13 is a thirty-two point signal space chart that can be used to code five digital bits into the two orthogonal channel signals, referred to in this graph as the "X" and "Y" signals. During each symbol time, a particular pair of values selected from this table will be applied to the two channel signals. For example, if the next five digital bits to be transmitted are 10100, then the "X" signal will be +1 Volt, and the "Y" signal will be −4 Volts. With this coding and a symbol rate of 70,000 symbols per second, a data transmission rate of 350,000 bits per second can be achieved, which is 2.5 times as much as provided by the simple coding discussed earlier. While there is no mathematical limit to the number of bits that may be encoded in each symbol, practical limits are determined by hardware complexity and the available signal to noise ratio.

The signal space mapper 21 (FIG. 3) encodes the binary data into symbols according to a specified number of bits per symbol. In the preferred embodiment, the mapper 21 is capable of encoding at a rate of 3, 4, 5, or 6 bits per symbol. Each symbol or transmit point is an x, y coordinate pair in QAM signal space. In the particular encoding scheme used, the two most significant bits (first two in time) of each transmit point received by the encoder 18 from the scrambler 16 represent the quadrant number of the point in signal space. To provide some immunities to a phase ambiguity in the receiver 12, these two bits are encoded as the phase (quadrant) change from the previous symbol and decoded accordingly in the receiver 12 (compare FIG. 6). This technique eliminates the need to know the absolute phase of the carrier at the receiver 12. The differential decoder 46 can then be more readily implemented in the signal space estimator of the receiver 12.

Figure 8C:
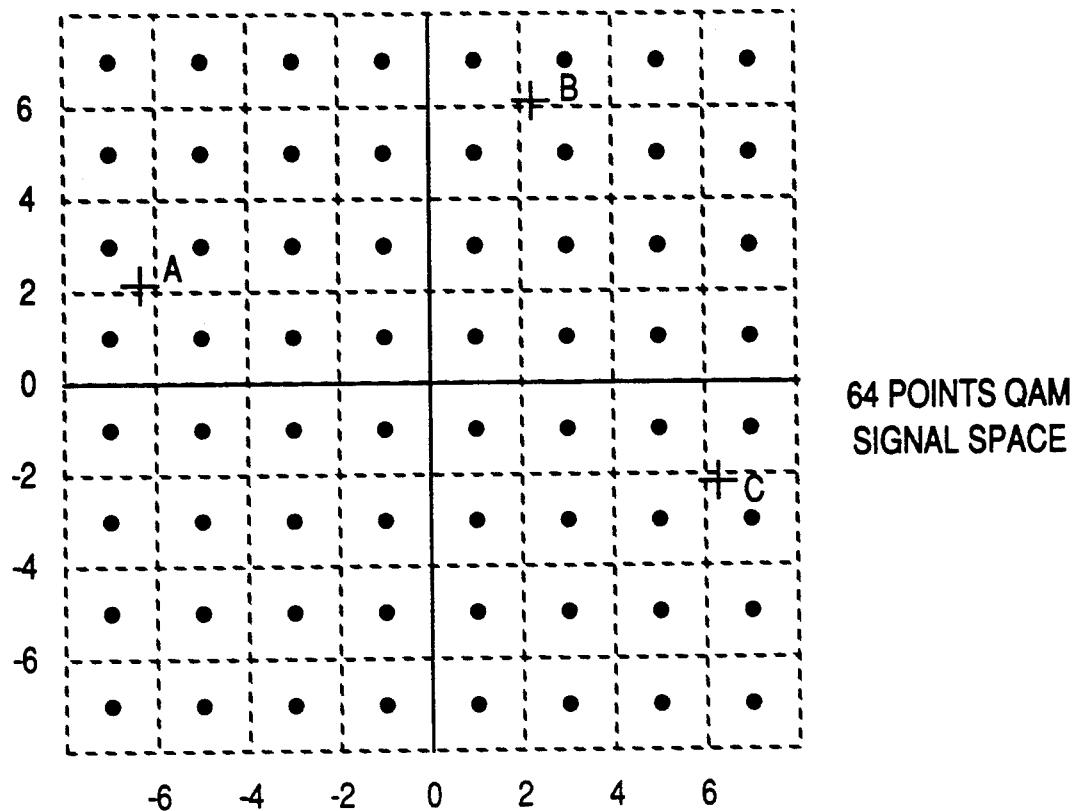
Figure 8D:
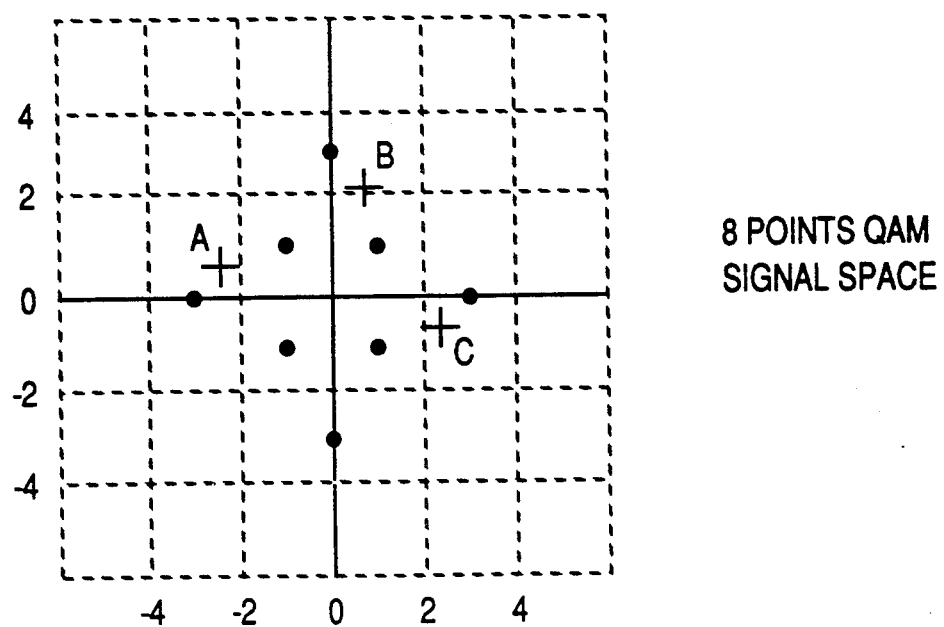

The preferred embodiment of the mapper 21 allows the variable use of four different symbol signal spaces having 8, 16, 32, and 64 transmit points (corresponding to 3, 4, 5 or 6 bits per symbol respectively). The different symbol signal spaces QAM8, QAM16, QAM32, and QAM64 are graphically depicted in FIGS. 8A-D. FIG. 8A illustrates the 32 point QAM signal space corresponding to FIG. 13. For a given symbol rate, the total data transmission rate varies with the number of points in the symbol signal space since more bits are then packed into each symbol. At the particular symbol rate of 70 kHz, the QAM8, QAM16. QAM32, and QAM64 symbol signal spaces result in QAM waveforms carrying digital data at 210 kHz (3 bits/symbol), 280 kHz (4 bits/symbol), 350 kHz (5 bits/symbol), and 420 kHz (6 bits/symbol), respectively. The use of as many common coordinate levels as possible in the different symbol signal spaces facilitates the use of a table look-up modulation method in the QAM modulator 22 with variable bit/symbol packing density.

B. Transmitter

Figure 6:
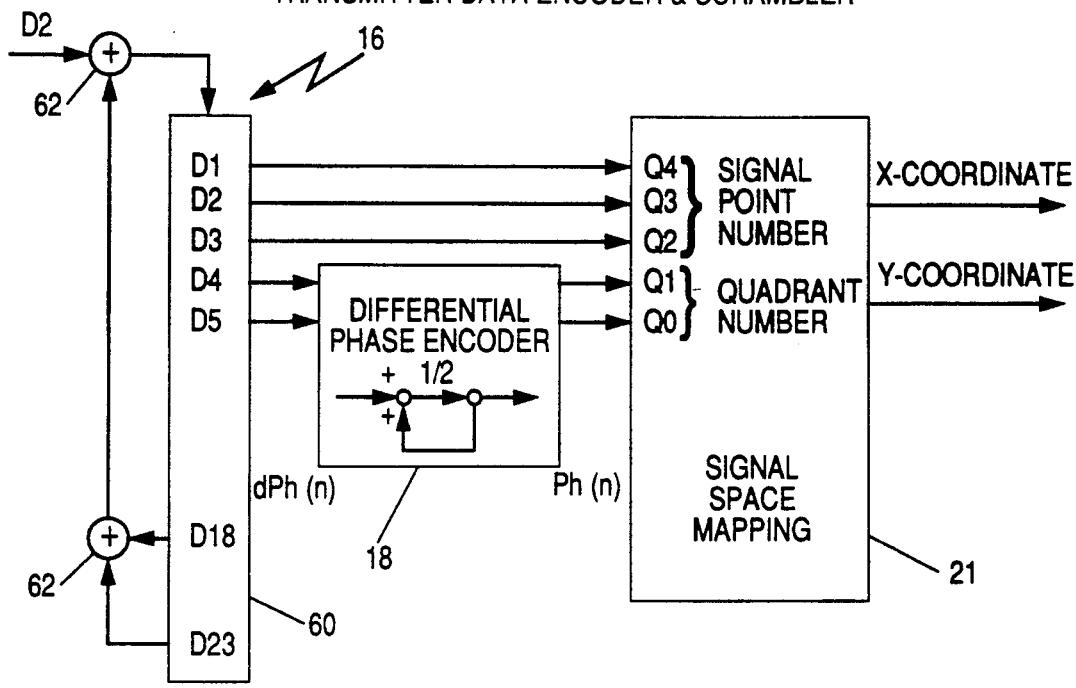
FIG. 6 is a block diagram of the scrambler and data encoder portions of a transmitter in accordance with the present invention.

Turning to FIGS. 2 and 6, the input data is scrambled by the scrambler 16 before being input to the encoder 18 and signal space mapper 21 in the modulator section 22 to make sure that the frequency spectrum of the line signal is relatively random. A random transmit signal spectrum is necessary for the proper operation of the adaptive equalizer 44 and timing acquisition in the receiver 12. The actual choice of the scrambler, however, is not critical to the transmitter operation. The scrambler 16 is shown in FIG. 6 as a 23-element shift register 60 connected to two exclusive-OR gates 62 which scramble the baseband input data i(n) in the following manner where "+" indicates an exclusive-OR operation:

$$d(n) = i(n) + d(n-18) + d(n-23).$$

Figure 7:
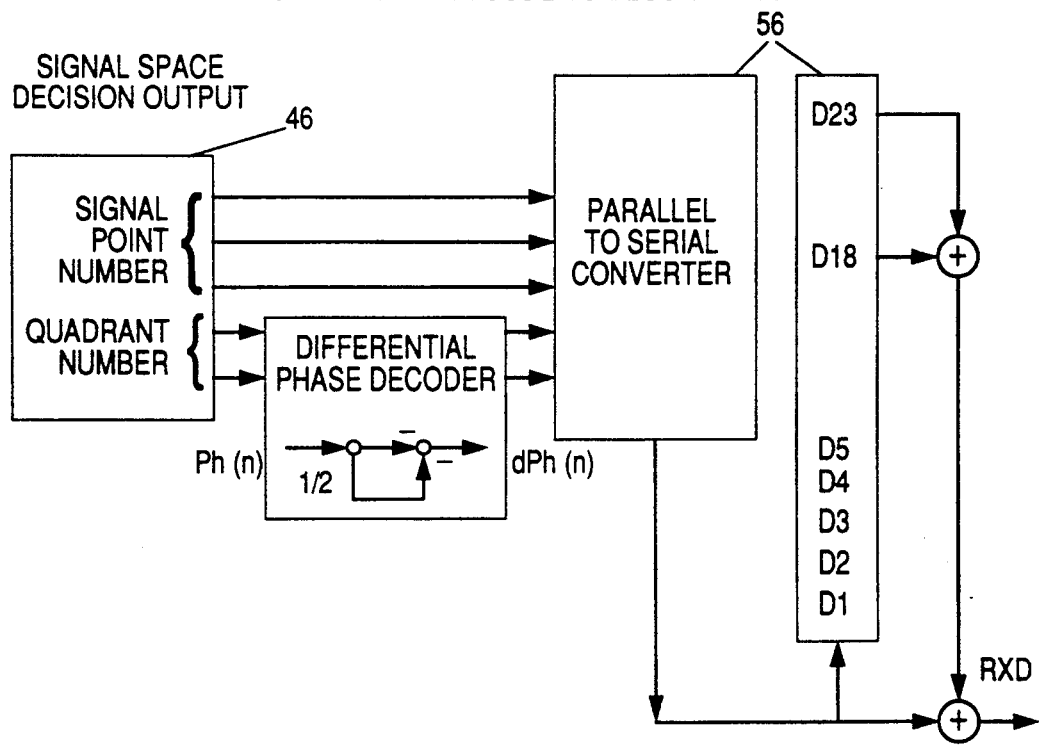
FIG. 7 is a block diagram of the data decoder and descrambler portions of a receiver in accordance with the present invention.

The advantage of using the long shift register 60 is that the odds of hitting a random pattern which fools the scrambler 16 and produces pure tones is very small. An inverse operation can be performed at the receiver 12 to give the original data back again as shown in FIG. 7.

The scrambler 16 receives the data one bit at a time from a data source in response to a transmit clock signal generated by the transmitter 10 when it is ready to receive data (e.g. CTS signal from interface 68 in FIG. 2). After a time long enough for the input data pulse to be received, the bit is clocked into the scrambler shift register 60 which implements the data scrambling method. After the number of input bits comprising one symbol (i.e., a symbol word) has been clocked into the scrambler 16, a scrambled symbol word results. The number of bits per symbol (and, hence, the data transmission rate) is selectable (by a two-bit input code) as 3,4,5, or 6 bits per symbol. FIG. 6 illustrates a 5 bit per symbol selection.

The symbol word is then sent from the scrambler 16 to the mapper 21 for encoding into transmit points or symbols consisting of x and y amplitude coordinates in QAM signal space. The x and y symbol coordinates are produced in this implementation at a symbol rate of 70 kHz for each of the two transmission channels in the logging cable 14.

FIG. 6 shows in detail the differential encoder 18 and signal space mapper 2 1. The mapper 21 encodes the binary data into symbols according to the specified number of bits per symbol (5 bits per symbol in FIG. 6). In the encoding scheme of FIG. 6, the differential encoder 18 uses the two most significant bits (first two in time) of each transmit point to represent the quadrant number of the point in signal space. To provide some immunities to a phase ambiguity in the receiver 12, these two bits are encoded as the phase (quadrant) change from the previous symbol and decoded accordingly in the receiver 12. This technique eliminates the need to know the absolute phase of the carrier at the receiver. The differential decoder 46 can then be implemented in the signal space estimator of the receiver 12.

After differential encoding of the two most significant bits of the scrambled input word by differential encoder 18, the resulting symbol word is used as part of the address to access a symbol from the signal space mapper 21 (ROM) by a table look-up procedure. This look-up procedure is discussed in more detail in the "Finite State Machine Implementation" section below. Each symbol or transmit point consists of a pair of x and y signal space coordinates with the differentially encoded two most significant bits of the symbol word determining the signal space quadrant. Each of the x and y coordinates is a 4-bit word output from the signal space mapper 21. The x and y coordinates for each symbol are sequentially accessed from the signal space mapper 21 with an additional bit in the address field designating whether the coordinate is x or y.

Turning to FIG. 2 a Training and Synchronization pattern generator 66 is shown connected to the multiplexer 20 for periodically generating a training pattern and synchronization pattern of symbol coordinates for transmission to the receiver 12. Such training and synchronization patterns are required for several reasons. First, the cable channel in the logging cable 18 are half duplex to prevent downlink transmissions and uplink transmissions from interfering with each other. Since the analog QAM waveform uplink 38 must be shut off periodically to allow downlink traffic, it is necessary to precede each uplink transmission 38 with a training pattern that allows the receiver 12 to reacquire the carrier frequency and phase. Due to the difficulty of reacquiring the exact phase, the two digital bits which represent the signal space quadrant are transmitted as a delta. For example, if the quadrant for the current symbol is ninety degrees clockwise from the previous symbol quadrant, then the value of the digital quadrant bits for the current symbol is 01, regardless of the actual quadrants transmitted. Thus the exact carrier phase need not be acquired in the receiver: the carrier phase may be off by any multiple of ninety degrees without any adverse effect.

Second, an adaptive equalizer 44 is used in the receiver 12 to provide a sufficiently large operating bandwidth on the standard logging cable 14. This increases the length of the required training pattern since the equalizer 44 must have some time to adapt to the channel after the carrier is acquired. The scrambler 16 assists by scrambling the incoming data so that a broad signal spectrum is provided for the adaptive equalizer 44.

Finally, the preferred embodiment uses two independent QAM channels on the logging cable 14—transmitting simultaneously—to provide the desired data transfer rate. Periodic synchronization patterns are transmitted on each channel so that the two channels may be reassembled into a single data stream at the receiver 12.

Because it is necessary to periodically transmit training and synchronization patterns multiplexor 20 controls whether the transmit points input to the modulator 22 are training points from the generator 66 or data points from the encoder 18. Further, interface 68 (FIG. 2) communicates with the data source (e.g. logging tools) by means of RTS (Request to Send) and CTS (Clear to Send) signals.

The transmitter 10 allows the use of four different symbol signal spaces having 8, 16, 32, or 64 transmit points and each signal space includes training points. The different QAM signal spaces are illustrated in FIGS. 8A-8D. Each signal space diagram 8A-8D includes the training points (points A, B, C, D) to be sent during training sequences which serve to synchronize the phase-locked loops 54 and train the adaptive equalizer 44 in the receiver 12. For each data rate, the training points are scaled to have the same amplitude as the average amplitude for all the points in the corresponding signal space. For the QAM16 and QAM32 signal spaces, the average signal power is 10, giving an average signal amplitude for all the points of sqrt(10). The training points are, therefore, chosen to be those points with a signal amplitude of sqrt(10):

Point A=(−3, 1)
Point B=(1, 3)
Point C=(3, −1)
Point D=(−1, −3).

For the QAM64 signal space, the average signal power is 42, giving an average signal amplitude of sqrt(42). Points with a distance from the origin of sqrt(42) can be computed by multiplying the previously selected training points with a signal amplitude of sqrt(10) by sqrt(42)/sqrt(10) or sqrt(4.2). Therefore, the training points for QAM64 are:

Point A=sqrt(4.2)*(−3,1)=(−6.148, 2.049)
Point B=sqrt(4.2)*(1,3)=(2.049, 6.148)
Point C=sqrt(4.2)*(3, −1)=(6.148, −2.049)
Point D=sqrt(4.2)*(−1, −3)=(−2.049, −6.148).

Similarly, for QAM8, which has an average signal power of 5.5 and an average signal amplitude of sqrt(5.5), the training points are:

Point A=sqrt(0.55)*(−3, 1)=(−2.22, 0.74)
Point B=sqrt(0.55)*(1, 3)=(0.74, 2.22)
Point C=sqrt(0.55)*(3, −1)=(2.22, −0.74)
Point D=sqrt(0.55)*(−1, −3)=(−0.74, −2.22)

The following table shows the coordinates of each signal space along with the signal power corresponding to the average amplitude for all the points in that signal space. Each coordinate of all the symbol signal spaces can be represented by just a 4-bit number. In the transmitter 10 the training point coordinates with non-integer values are still represented by 4-bit numbers by incorporating the training point amplitude into the lowpass digital filter coefficients. However, with a scheme in which the different signal spaces have coordinates in common, the output power levels for each data rate will generally be different. With the exception of the data rates corresponding to the QAM16 and QAM32 signal spaces, a gain level compensation is required at the transmitter D/A 35 output to ensure the transmit signal output level is always the same for all data rates.

| Signal Space | Coordinate Levels Used | Avg. Power |
|---|---|---|
| QAM64 | 0, 1, 3, 5, 7, 2.0494, 6.1482 | 42.0 |
| QAM32 | 0, 1, 2, 3, 4 | 10.0 |
| QAM16 | 0, 1, 3 | 10.0 |
| QAM8 | 0, 1, 3, 0.7416, 2.2249 | 5.5 |

Turning to FIG. 3, the function of the baseband lowpass digital filters 24 and 26 are to accordingly restrict the bandwidth of the x and y symbol coordinate stream in a manner which minimizes intersymbol interference. This is because the frequency content of the symbol stream must be maintained below the carrier frequency in order for the symbol stream to be completely recoverable.

Filtering the digital data (see FIG. 3) prevents each signal from interfering with nearby symbols. It is not possible to filter signals so that they do not extend past the allocated symbol time-, instead, the intersymbol interference is controlled by filtering each signal pulse into a Sin(X)/X shaped pulse as shown below in FIG. 14.

Figure 14:
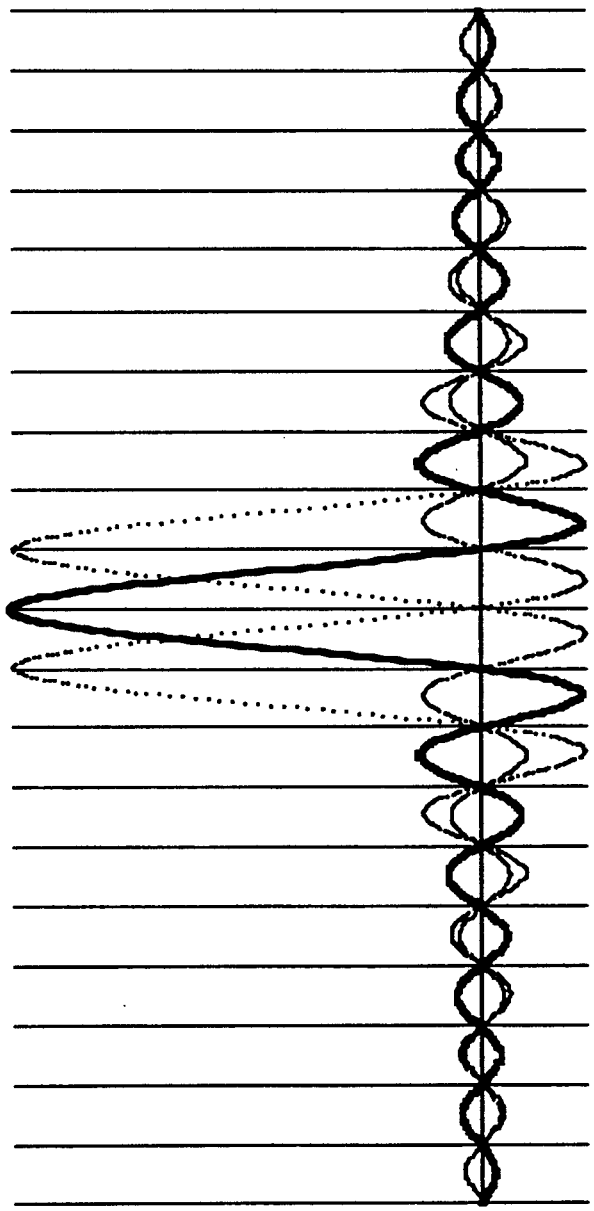
FIG. 14 is a graph describing intersymbol interference for Sin(X)/X shaped pulses.

Each signal pulse has maximum amplitude at its transmitted symbol time. During each of the preceding and subsequent symbol times, the pulse is shaped so that it has a zero amplitude. FIG. 14 illustrates this point. The series of vertical lines mark each symbol time. The bold line is a Sin(X)/X signal pulse, and the dashed lines are pulses generated one symbol time before and after the bold pulse. Note that when the bold pulse is at its maximum, the adjacent pulses are at zero. Indeed, one may observe that all three pulses are at zero during any preceding or subsequent symbol time. Thus at the point of interest, the symbol time, there is no interference to the current signal pulse from any prior or subsequent signal pulse.

Preferably the pulse shaping filters—such as 24,26 in FIG. 3 are split between the transmitter and receiver. This affords two advantages. First, each filter is only half as complex as would otherwise be required. Since finite impulse response filter requirements of 70 or more taps are not uncommon, splitting the filter may be the only reasonable implementation. Second, having a matched transmitter and receiver filter pair increases channel noise rejection, increasing the effective signal to noise ratio.

Although the frequency content of a sample pulse train is theoretically infinite, it is well-known that the bandwidth E required to transmit a train of sample pulses without loss of information must only be equal to one-half the sample frequency or ½T where T is the sample period. Thus, in order to minimize the bandwidth required to transmit the signal (or, equivalently, to maximize the rate at which samples can be transmitted given a certain bandwidth), only the criteria stated above must be met. That criteria, however, assumes a bandwidth with ideal low-pass filter characteristics. If a train of sample pulses has a sample period (i.e., the time between pulses) much larger than the width of each individual pulse, the waveform can be approximated by train of impulse functions. This means that as each pulse passes through an ideal low-pass filter with bandwidth E, the resulting output is the impulse response of the filter, a (sin 2]Et)/2]Et waveform (also called a sinc pulse), scaled and delayed by the amplitude and position of the input pulse. Each such sinc pulse has zero crossings at time intervals of ½E from the time the input pulse passes through the filter. Therefore, if in accordance with the bandwidth criteria E=½T, then T=½E where T is the sampling interval. This means that the contributions from all filtered pulses at a certain sampling instant are exactly zero, except for the pulse actually occurring at that sampling instant. Thus, there is zero interference between, adjacent pulses (i.e., no intersymbol interference, See FIG. 14).

As discussed below, the best mode uses a finite state machine implementation to account for desired filtering, but the filter operation shown in FIG. 3 should be understood to implement such a finite state machine. Of course, an alternative embodiment may be constructed with discrete filters 24, 26 as shown in FIG. 3.

Although ideal filters such as 24, 26 of FIG. 3 are physically unrealizable, a low-pass filter having an impulse response with the desired uniformly spaced zeros (called a Nyquist filter) can be constructed if the magnitude of the filter's frequency response has odd symmetry about the low-pass cutoff frequency. One well-known particular type of such a filter is referred to as a raised cosine filter. The raised cosine frequency response consists of a constant magnitude at low frequencies and a sinusoidal roll-off portion with odd symmetry about the cutoff frequency. Raised cosine filters can be characterized by a parameter which indicates the shape of the roll-off portion, with a=1 being known as a full-cosine roll-off characteristic and a=0 coinciding with an ideal low-pass filter. Each of the baseband digital filters 24 and 26 may be a transversal-type FIR implementation of a raised cosine filter where a=¼.

After filtering of the symbol stream by the digital filters 24 and 26, serial samples of one of the orthogonal carrier waveforms are multiplied at 28 by the series of x coordinate values with the other orthogonal waveform being multiplied at 30 by the y coordinate values. The two orthogonal waveforms thus modulated are then added at 32 to produce a sampled version 34 of the QAM modulated waveform at a sample rate.

In order to amplitude-modulate the carrier waveform (at 28, 30 FIG. 3) in the digital domain, each sample of the carrier waveform is multiplied by the x or y symbol stream coordinates. In order for there to be corresponding samples between the 210-Hz sample sequence of the carrier and the 70-kHz symbol stream, the modulation is effectively performed as if the symbol stream were produced at 210 kHz by inserting two points of zero amplitude between each of the symbols occurring in the 70 kHz x and y symbol streams output from the mapper 21. This results in a modified symbol stream at 210 kHz with two of every three symbols equal to zero.

A 36-stage transversal-type filter normally requires 36 multiplications and 36 additions to produce each output sample. However, the interposition of two zeros between each symbol in the modified symbol stream means that only 12 multiplications between the symbol coordinates and the corresponding filter coefficients and 12 additions of those products need to be performed to give each filtered output value of the modified symbol stream. In the preferred embodiment, a table look-up procedure is used in lieu of the multiplication operation so that a value corresponding to each symbol coordinate multiplied by each of the 36 filter coefficients is stored in memory. Each of those products is accessed by an address signal containing a particular symbol coordinate value and a filter coefficient designation.

To further reduce the computational overhead of the modulator 22 the sample rate is chosen to be an integral multiple of the carrier frequency. By setting the sampling rate at four times the carrier frequency, the carrier phase can be adjusted to be an integer multiple of $\pi/2$ at the moment of a data sample, resulting in a carrier amplitude of 0,1,0, or −1. For the logging cable 14, the usable bandwidth is in the approximate range of 10 kHz to 90 kHz. In the preferred embodiment, the carrier frequency is set at 52.5 kHz and uses the 70 kHz bandwidth from 17.5 kHz to 87.5 kHz.

The fact that the sample sequence of one of the orthogonal carrier waveforms cycles through the values 1, 0, −1, 0, while the other orthogonal carrier cycles through the values 0, 1, 0, −1 is advantageous. Thus, in order to modulate one of the carrier waveforms, only the non-zero carrier samples must be replaced by samples of the filtered symbol coordinate stream after the latter have passed through the 36-stage filter. That gives sample sequences of fx(n), 0, −fx(n+2), 0, . . . , and 0, fy(n+1), 0, −fy(n+3), . . . , for the carriers modulated with x and y symbol coordinate streams, respectively, where fx(n) is the nth filter output of the x coordinate filter and fy(n) is the nth filter output of the y coordinate filter. Adding the two modulated waveforms at 32 to form the complete QAM modulated waveform 34 gives a sample sequence of fx(n), fy(n+1), −fx(n+2), −fy(n+3), ... Therefore, one of every two filter computations can be eliminated for each of the x and y symbol coordinate streams.

Furthermore, instead of actual addition between the modulated x and y carrier sample sequences to give samples of the complete QAM modulated waveform, the modulated x and y carrier samples need only be interwoven by alternately selecting the nonzero samples of either the modulated x carrier or y carrier for outputting. This also means that there is no need for separate x coordinate and y coordinate filters (although illustrated conceptually for clarity in FIG. 3). An even further computational advantage is obtained by also storing negative representations of the filter products which can be accessed when the carrier phase is negative. This means that the filtering of the symbol coordinate streams, modulation of an orthogonal carrier waveform by each of the filtered symbol coordinate streams, and addition of the modulated carriers to form the complete QAM sample waveform 34 can all be performed by outputting the sum of the filter products corresponding to the last 12 values of each of the x and y coordinates in alternate fashion, where account is taken of the carrier phase when the filter products are accessed.

After the modulator 22, the sampled QAM waveform 34 is fed to D/A converter 35 and transmit low-pass filter 36 before being fed to line driver 37 which outputs the analog QAM waveform 38 out over the transmission channel or channels in the logging cable 14. The purpose of the transmit low-pass filter 36 is to attenuate the spectral replica frequency components of the output signal of the D/A converter 35 which are centered about the sampling frequency (210 kHz). Those spectral replica frequency components are a consequence of the QAM waveform being digitized and would cause aliasing distortion if not removed prior to the analog QAM waveform being resampled at the receiver 12.

For example, in the preferred embodiment the transmitter 10 outputs a modulated 52.5-kHz carrier at a sample rate of 210 kHz to the D/A converter 35. Assuming that the baseband low-pass filters 24 and 26 restrict the bandwidth of the symbol stream to a frequency below the carrier frequency (e.g., to about 44 kHz), the final QAM output waveform will contain the symbol data signal centered at 52.5 kHz with lower and upper band edges at 8.5 kHz and 96.5 kHz, respectively. A spectral replica of that signal will also appear, centered at the sample frequency of 210 kHz with band edges at 113.5 kHz and 306.5 kHz. The transmit low-pass filter 36 should attenuate this spectral replica signal without distorting the symbol data signal. An example of such a filter is a fourth or fifth order Butterworth low-pass filter having a breakpoint at approximately 110 kHz.

C. Logging Cable

Figure 9:
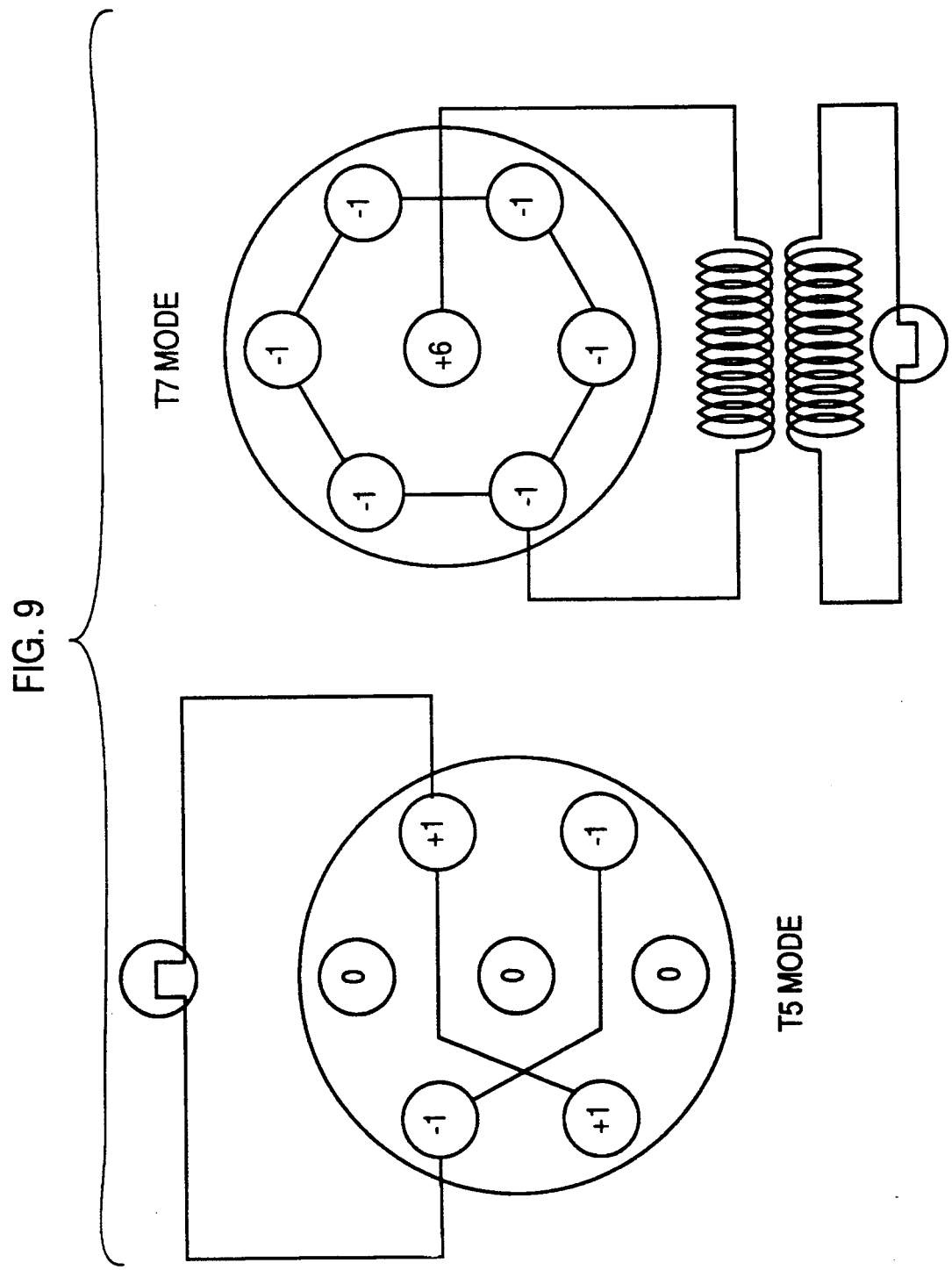
FIG. 9 diagrammatically depicts the orthogonal T5 and T7 transmission modes of logging heptacable.

In the preferred embodiment, the bandpass channel for the sampled waveform 34 is standard wireline logging cable 14, known as heptacable and illustrated in FIG. 9. In wireline logging the tool power is typically at 60 Hz and 700 volts. Above about 100 kHz the transfer function of the signal to noise ratio is degraded. Therefore the preferred embodiment of the present invention uses a communications channel in the frequency range of 10–90 kHz range, preferably the 70 kHz range centered on 52.5 kHz (17.5–87.5 kHz).

To achieve the desired communications rate, two channels of the logging cable 14 are used. The transmitter 10 alternately divides the symbols generated into two groups in order to produce two QAM sampled waveforms 34 which are transmitted simultaneously over two separate channels designated T5 and T7 (FIG. 9). This effectively doubles the data transmission rate over what it would be if only one channel were used. T5 and T7 are the designations commonly used for the two orthogonal modes of a multiconductor transmission cable known as heptacable. The T5 and T7 modes of heptacable are as shown in FIG. 9. If the receiver 12 is appropriately synchronized, the two streams of symbols recovered after demodulation of each channel can be interwoven to reproduce the original symbol stream.

D. Receiver

Referring to the Receiver Block Diagram in FIG. 2, the receiver 12 recovers the binary input data sent by the transmitter 10 over the transmission channel 14. Line buffer 48 buffers the QAM signal over either the T5 or T7 transmission channel. After filtering by bandpass filter (BPF) 50 and gain adjustment by automatic gain controller (AGC) 52, the signal is digitized by A/D converter 40 operating at the same 210-kHz sample rate as the transmitter 10. The timing phase-locked loop 54 includes bandedge timing filters in order to derive a sample clock signal for driving the A/D converter 40, as well as provide a symbol clock signal.

The digital samples of the input waveform from the A/D converter 40 are demodulated by demodulator 42 using essentially an inverse operation of the modulation procedure performed in the transmitter as shown in FIG. 4. The A/D output is sent to the demodulator 42 at 210 kilosamples per second. The demodulator 42 is essentially two finite impulse response filters 41,43, each with 36 taps and having raised cosine frequency response matched to the corresponding transmitter filters 24,26. By discarding every two out of three filter output values at 210 kHz (the input zero values), the output from demodulator 42 is a pair of 16 bit words at 70,000 samples per second (xr and xi in FIG. 4) corresponding to the x and y coordinate stream from the transmitter 10.

The demodulator coordinate outputs are input to adaptive equalizer 44 at the symbol rate of 70 kHz in order to reduce intersymbol interference. The decoder module 46 takes each of the x and y coordinate streams and produces a decoded digital output stream at a rate corresponding to the specified bit/symbol packing density using a table look-up procedure. Error signals are also derived from the decoding operation in order to update the taps of adaptive equalizer 44. Finally, the data is unscrambled by descrambler 56 as shown in FIGS. 2 and 7 to produce the original baseband input signal.

E. Finite State Machine Implementation

A first embodiment of the transmitter depicted in FIG. 2 used two microprocessors for implementation. In this embodiment a first processor performs the functions of scrambler 16, encoder 18, interface and state controller 68, generator 66 and data selector multiplexor 20 ("transmit function"). A second processor performed all of the functions of the modulator 22 ("modulator function"). While this embodiment is functionally operable and an acceptable alternative, it is presently believed that the preferred embodiment is a "finite state machine" implementation in which the microprocessors are eliminated from the transmitter 10. In such a finite state machine implementation a number of components—and hence the cost and complexity—are eliminated.

1. Transmit Function Control Logic

The transmit function comprises a primary 8 state machine and a secondary 30,728 state machine, with a total of 153,918 states actually used. With the large number of states involved, the transmit function is decomposed into two linked state machines.

The secondary 30,728 state machine is designed as a slave to the primary state machine, and the control logic is a simple counter that is incremented at each symbol time and is reset by any state transition in the primary state machine. In turn, the secondary state machine is used to drive certain transitions in the primary state machine and to control the data path in some states.

Figure 10:
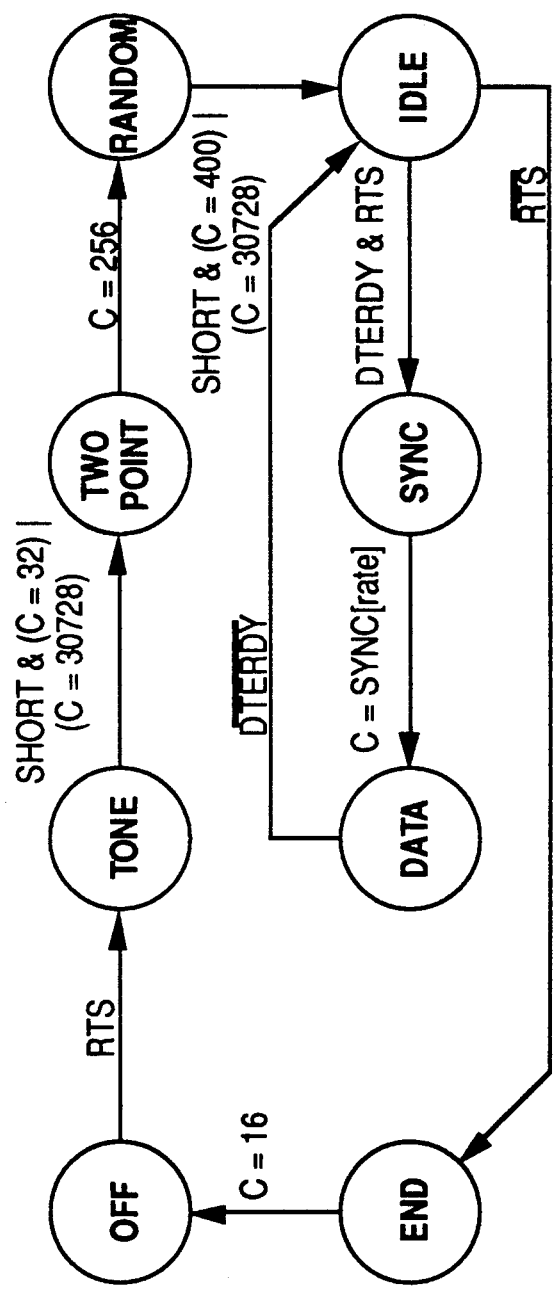
FIG. 10 is a flow diagram of the control logic of the primary state machine.

FIG. 10 is a flow diagram of the control logic of the primary state machine. This 8 state machine selects the basic operating mode of the transmitter 10: OFF (no signal), TONE (for carrier frequency acquisition), TWO-POINT (for carrier phase recovery), RANDOM (for equalizer adaptation), IDLE (waiting for input data to transmit), SYNC (for recombining the two channels), DATA (data transmission), and END (fuming off signal with minimal transients). The state of the primary state machine is used to select the fundamental type of point to be modulated, i.e. data, synchronization, training, etc.; however, it does not select the precise point. The precise point is selected based on the state of the secondary state machine, except in the case of DATA mode. In DATA mode, the point to be modulated is the Transmit Data after it has been processed by the scrambler 16 and the encoder 18 (FIG. 2).

The signals RTS, DTERDY, and SHORT are inputs to the transmitter. They stand for Request To Send, Date Terminal Equipment ReaDY, and SHORT training mode, respectively. The function SYNC[rate] is a simple boolean equation that selects the length of the synchronization pattern as a function of the data rate. The variable "C" in FIG. 10 represents the current state of the secondary state machine. By putting "C" in a separate state machine, the primary state machine control logic is straightforward.

been included, there would be at least twelve state transitions per symbol, greatly complicating the design. Instead, these functions are included with the modulation function.

2. Modulation Function Control Logic

The modulation function performs signal space mapping, filtering, carrier multiplication, and quadrature summation as shown in FIG. 3. These functions are implemented as a 78 state modulation state machine and a 4 state carrier phase state machine. The data scrambler and encoder functions are also included in the modulation state machine since these functions can be added without increasing the number of states required.

The control logic for the modulation state machine is relatively straightforward. The modulation state machine cycles through each of the 78 states in order at a 5.46 Mhz rate. The 36 stage pulse shaping filters 24,26 (FIG. 3) use 72 states. The remaining 6 states are used to read in the coordinates for the next symbol. The 5.46 clock frequency is used so that the modulation state machine made one complete cycle every symbol time, which is at a 70 kHz rate. The transitions of the primary and secondary state machines are triggered by the completion of one cycle of the modulation state machine. As a result, these three state machines always stayed synchronized with each other.

The carrier phase state machine control logic is equally straightforward. It is also synchronized with the modulation state machine, advancing one state after every 26 state transitions of the modulation state machine. The carrier phase advanced by increments of 90 degrees, thereby covering the full 360 degree phase range in its 4 state cycle. This timing provides the necessary 52.5 kHz carrier frequency.

3. Control Logic Summary

In summary, the transmit and modulator function of the transmitter 10 comprises four linked finite state machines: primary (8 states), secondary (30,728 states), modulation (78 states), and carrier phase (4 states). The state variables for these machine are 3, 15, 7, and 2 bits long, respectively, for a total state variable length of 27 bits. This arrangement of state machines can control both the T5 and T7 channels of FIG. 9.

The control of these state machines is straightforward. The entire control logic for the whole control algorithm is expressed as follows:

```
do (forever)
{
    if ((+ +Modulation_State % 26) = = 0)
    {
        if (+ +Carrier_Phase_State = = 4) Carrier_Phase_State = 0;
        if (Modulation_State = = 78)
        {
            Modulation_State = 0;
            + +Secondary_State;
            ... compute Primary_State transition from
                flow diagram in Figure 4
            if (Primary_State transition) Secondary_State = 0;
        }
    }
    Process_Data_Flow(  Primary_State,    Secondary_State,
                        Modulation_State, Carrier_Phase_State );
}
```

Although the data scrambler and encoder functions were performed by the Transmit Processor in the first embodiment, they are not included in the primary and secondary state machines described above. With the current design, all transitions occur on symbol time boundaries. If the scrambler or encoder functions had Because the control logic is simplified to the point that a discrete hardware approach is feasible, then discrete implementation of the data path logic eliminates all processors.

4. Data Path Logic

With the implementing of the control logic with discrete logic, it is very desirable to eliminate any remaining processors from the transmitter 10 to manipulate the data path. All of the data path logic except the Pulse Shaping Filter has a reasonably straightforward discrete implementation. The scrambler 16 is implemented discretely with a 23 bit feedback shift register 60. An 8 bit latch, multiplexor, and 2 bit adder form part of the discrete encoder 18 and mapper 21, with the data selector and signal space mapping functions implemented with a table lookup in a 2K×4 ROM controlled by the primary and secondary state machines. Although the logic to implement the table lookup is simple, generating the correct tables is more difficult.

The multiplication to be performed in the modulator 22 is:

Signal Space Coordinate • Pulse Shaping Filter Coefficient • Carrier Value.

There are a limited number of values to be multiplied. There are only 2 different carrier values and 36 different pulse shaping filter coefficients. There are a large number of signal space coordinate values; however, by normalizing these values for each rate it is possible to use as few as 56 values. The impact of this normalization is that each rate has slightly different average transmitted power, but this is considered an acceptable penalty. As a result, there are only 4032 possible product values. This enables the multiplier to be implemented with a table lookup. Thus the modulation function (pulse shaping filters 24,26, multiply 28, and add 32 in FIG. 3) are implemented with a 64×4 RAM, two 8K×8 ROMs, and a 16 bit adder.

The total data path logic requires a 1000 gate programmable device, a 2K×4 ROM, two 8K×8 ROMS. and a 64×4 RAM. The state machine control logic requires only a single 2000 gate programmable device. In addition, a 5.46 oscillator is needed to clock the state transitions, and a pair of 12 bit D/A converters are needed to convert, the digital output to an analog QAM signal, for a total of 9 components for two complete modulators.

5. Data Path Tables

Because of the complexity of the data path, the Data Selector and Signal Space Mapping functions are implemented as a table lookup in the mapper 21. This table is referred to as the modulation table. The output from this table is the X and Y coordinates for the current symbol, depending upon the current carrier phase. When the carrier phase is 0 or 180 degrees, the cosine modulator is active so the XYSEL address selects the X coordinate. When the carrier phase is 90 or 270 degrees, the sine modulator is active so the Y coordinate is selected.

The data path of the transmitter is shown in block diagram form in FIG. 5 where the signal space mapper 21 of FIG. 6 comprises a modulation table 74 and RAM buffer 76. As previously noted, the two most significant bits of the scrambled input word from the differential encoder 18 and the remaining bits form a symbol word (FIG. 6) which is used to access a symbol from the modulation table 74 by a table look-up procedure. Each symbol or transmit point consists of a pair of x and y signal space coordinates with the differentially encoded two most significant bits of the symbol word determining the signal space quadrant. As shown in FIG. 5, each of the x and y coordinates is a 4-bit word, MROM(0:3), output from the modulation table 74. The x and y coordinates for each symbol are sequentially accessed from the modulation table 74 with an additional bit in the address field designating whether the coordinate is x or y.

The symbol coordinates thus generated are sequentially stored in a buffer 76 which is a RAM (random access memory) containing four separate circular first-in/first-out (FIFO) queues for storing the last 12 values of each x and y coordinate for each of the T5 and T7 symbol streams.

The storage of the past values are necessary in order to perform the FIR digital filtering operation in the filter ROM 24,26. According to the modulation method used, each of the x and y coordinate streams is to pass through a 36-stage transversal-type digital filter before being combined to form the sampled QAM waveform.

As noted earlier, since the symbol rate is one-third the sample rate, only the last 12 values of each coordinate stream are needed to produce each sample of the filter output by multiplying each coordinate value by the appropriate filter coefficient and summing the products (Compare FIGS. 3 and 5). Every possible such filter product is stored in the filter ROM 24,26 as a 16-bit two's complement number accessible by an address containing the particular coordinate and filter tap number corresponding to the product. Another bit in the address field specifies whether the positive or negative representation of the filter product is to be accessed which, as alluded to earlier, snows the filter ROM table look-up procedure to effect the amplitude-modulation of a sinusoidal carrier having sample values of only 1 or −1.

The filter products thus accessed from the filter ROM 24,26 (FIG. 5) are serially fed to a pipeline-type filter adder 32 which computes the sum of 12 filter products to form each 12-bit sample of the final QAM output waveform. The alternate outputting of the filtered x coordinate or y coordinate streams effectively adds the two modulated orthogonal carriers together.

The time between successive samples of the output waveforms for each transmission channel (1/70 kHz) allows the processing for one channel to be done while a sample is being output over the other channel. As each sample is generated by the filter adder 32, that sample is output to one of a pair of D/A converters 35 which form the analog output signal for transmission over either the T5 or T7 transmission channels.

Figure 11:
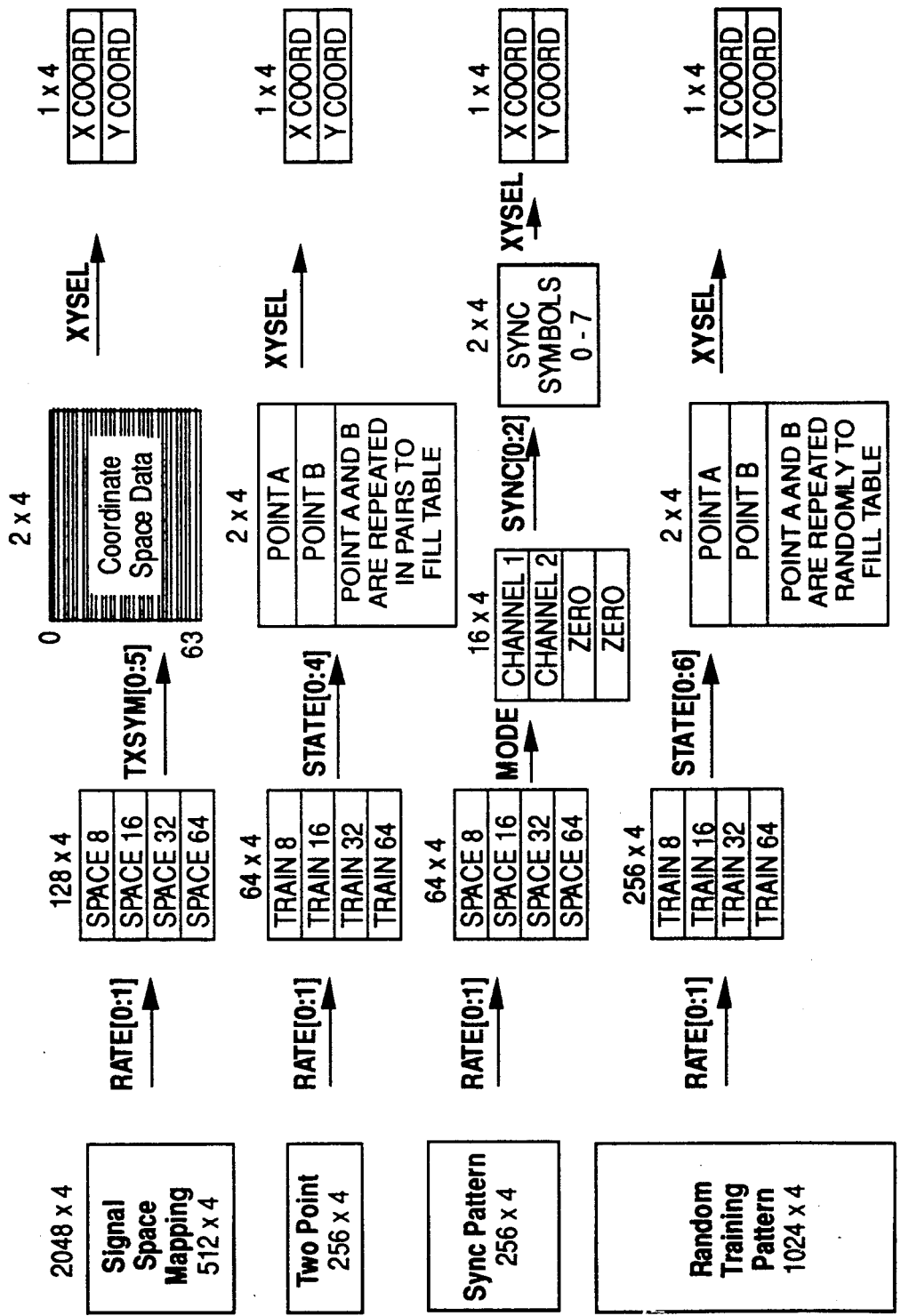
FIG. 11 is a modulation table indexed by the primary state machine.

The modulation table 74 is indexed by the primary state machine, and is functionally divided into four parts as shown in FIG. 11. During the OFF and END states (FIG. 10). the sync pattern subtable is selected with the mode set so that the zero coordinates are always selected (FIGS. 8A–8D). During the TONE state, the two point subtable is selected with the state set so that training point A is always selected (FIGS. 8A–8D). During the TWO POINT state, the two point subtable is selected and training points A and B are transmitted alternately. During the RANDOM state, the random subtable is selected, transmitting training points A and B in a pseudo-random fashion. During the IDLE and DATA states, the signal mapping subtable is selected, which selected actual signal space points for the current digital data pattern. During the SYNC state, the sync subtable is selected, transmitting the special synchronization symbols in order. For each subtable, the rate control selects which signal space or training space to use: 8 point, 16 point, 32 point, or 64 point shown in FIGS. 8A–8D; this selects 3, 4, 5, or 6 bits to be packed into each symbol, respectively.

The secondary state machine provides an index into all of the subtables except the signal space mapping subtable. For the two point subtable, it provides STATE[0:4], which selected points A and B in order. For the sync pattern subtable, it provides SYNC[0:2], which selects the synchronization symbols in order. For the random subtable, it provides STATE[0:6], which selects a 128 symbol pseudo-random sequence. For the signal space mapping subtable, the main index is provided by the digital data to be transmitted, TXSYM[0:5]. The random subtable requires 1024 entries, and the signal space mapping subtable requires 512 entries, for a minimum ROM size of 2K×4. Since 512 locations of the ROM are still available, they are divided evenly between the other two subtables. Though the other tables do not need that much space, this allocation makes indexing the ROM easier. A map of the ROM allocations is summarized in FIG. 11.

Figure 12:
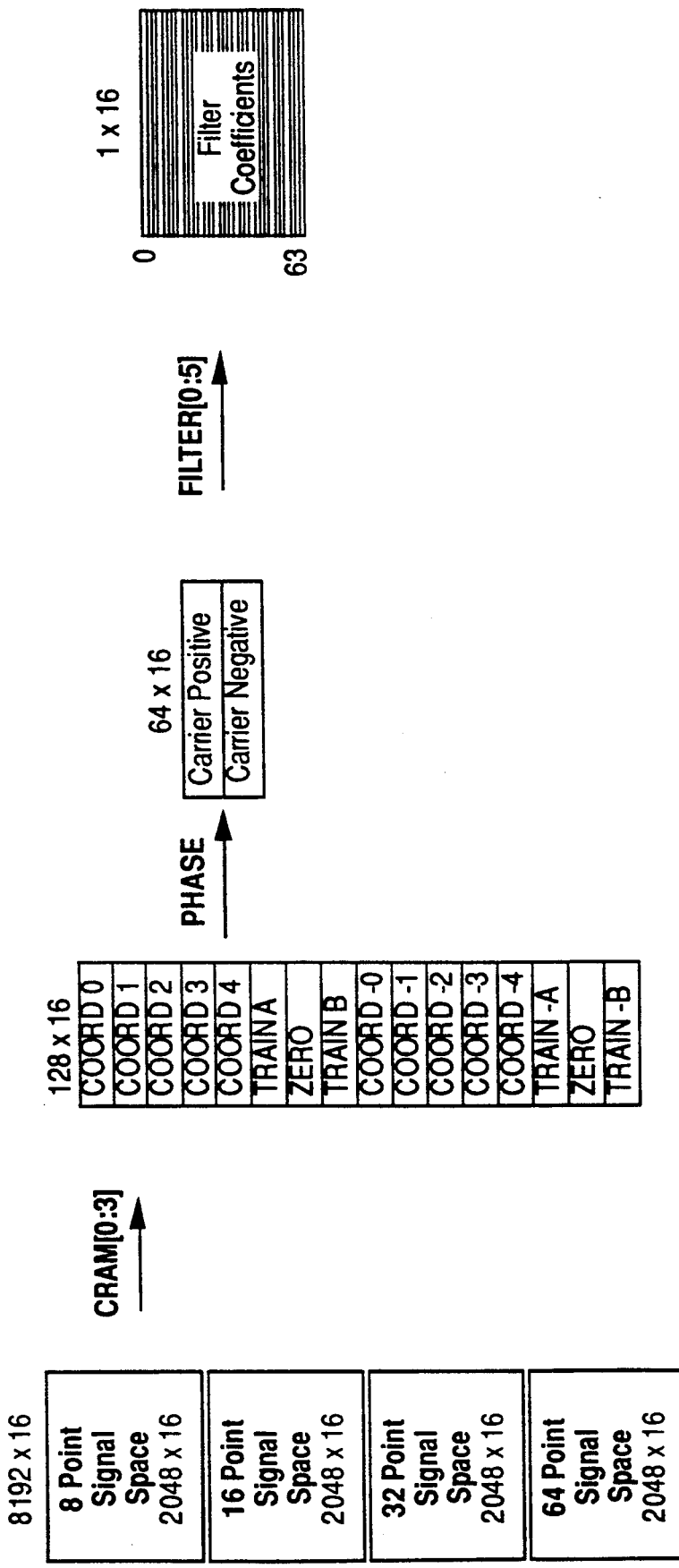
FIG. 12 is a look-up table representing the filter multiplication.

The filter multiplication is also implemented as a table lookup. This table is divided into four subtables based on the size of the signal space, as shown in FIG. 12. Depending upon the signal space size, the coordinates receive different scaling factors so that the average signal power can be maximized. For each signal space, there are up to 14 different coordinate values. Each coordinate is multiplied by the two possible carrier values. The resulting 28 values are multiplied by each of the 36 filter coefficients. These values are the required 16 bit outputs from this table.

Since there were only 4032 possible output values needed, a 4K ROM could suffice. However, the logical indexes to this ROM are the 4 signal spaces (2 bits), the 14 coordinate values (4 bits), the 2 carrier values (1 bit), and the 36 filter coefficients (6 bits), for a total index of 13 bits, which implies an 8K ROM. Due to the amount of logic needed to translate these 13 index bits into 12 index bits for using the smaller ROM, the extra cost of the larger ROM is justified. The resulting memory allocation map is shown in FIG. 12.

What is claimed is:

1. A transmitter for acquiring digital input data and modulating the data onto an analog transmission carrier signal, comprising:
    means for acquiring the digital input data;
    mapping means coupled to the acquiring means for mapping the digital input data into a series of symbols representing points in signal space, and for outputting the location of the points as two digital coordinate streams representing the x and y coordinates of the points;
    modulation means for quadrature amplitude modulating the x and y digital coordinate streams to orthogonal carrier signals and combining the orthogonal carrier signals, the modulation means being a finite state implementation without microprocessors and including
        table means for storing product values where the multiplication factors in the product values are said digital coordinate stream value multiplied by said digital sample value of the respective orthogonal carrier signal,
        the product values of the table means being the product of the respective coordinate stream value, a digital sample value of an orthogonal carrier signal, and a pulse shaping filter coefficient, and
    means for adding the x and y product values to form digital sampled waveform sums; and
    digital to analog converter means, for converting the digital sampled waveform sums into an analog transmission carrier signal.

2. The transmitter of claim 1, wherein the filter coefficients are stored in a digital storage device and are operable to reduce interference between adjacent coordinate stream values.

3. The transmitter of claim 1, the modulation means including a random access memory device, a read only memory device, a multiple-bit adder, a clock oscillator, and a digital to analog converter.

4. The transmitter of claim 1, wherein the mapping means comprises a coordinate lookup table storing the x and y coordinate values for each symbol.

5. The transmitter of claim 4, wherein the coordinate lookup table accesses and outputs the stored x and y coordinate value depending on the phase of the orthogonal carrier signals.

6. The transmitter of claim 5, wherein the x coordinate values are accessed and output if the carrier signal phase is 0 or 180 degrees and the y coordinate values are accessed and output if the carrier phase is 90 or 270 degrees.

7. The transmitter of claim 1, wherein the digital sample values of the carrier signals represent samples at a sample rate of 210 kilohertz and the carrier frequency of the carrier signals is 52.5 kilohertz.

8. A method of transmitting acquired digital data over a bandpass channel comprising the steps of:
    mapping the acquired digital data into a series of symbols representing locations in signal space at a symbol rate where a certain sequence of digital bits is represented by a unique symbol;
    outputting the location of the symbols in signal space as x and y digital coordinate streams;
    modulating orthogonal carrier signals with the x and y coordinate digital streams to produce a digital transmission waveform at a sample rate including the steps of:
        storing product values in a table storage device, where multiplication factors in the product values include a coordinate stream value and a digital sample of the respective orthogonal carrier signal,
        the product values including a filtering factor to restrict bandwidth and adjust pulse shaping, and adding said product values to form digital sampled waveform sums;
    converting the digital sampled waveform sums to an analog transmission waveform; and
    transmitting the analog transmission waveform over the bandpass channel.

9. The method of claim 8, in said mapping step each symbol being used to find a location in a lookup table storing the x and y coordinates for that symbol, said outputting step comprising serially outputting two coordinate streams, one stream comprising the stored x coordinates and the other stream comprising the stored y coordinates.

10. The method of claim 9, the carrier signals having a carrier frequency and the digital samples of the carrier signals being taken at a sample rate that is four times the carrier frequency.

11. The method of claim 10, wherein the two orthogonal carrier signals have a carrier phase which is an integer multiple of $\pi/2$ during each sample time.

12. The method of claim 10, where the sample rate is an integer multiple of the symbol rate.

* * * * *